United States Patent
Masuda et al.

(10) Patent No.: US 6,942,907 B2
(45) Date of Patent: Sep. 13, 2005

(54) PROTECTIVE LAYER THERMAL TRANSFER SHEET AND PRINTED ARTICLE WITH PROTECTIVE LAYER

(75) Inventors: Kazuhiro Masuda, Tokyo (JP); Masahiro Yuki, Tokyo (JP); Makoto Hashiba, Tokyo (JP); Kazutoshi Awano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/941,857

(22) Filed: Sep. 16, 2004

(65) Prior Publication Data

US 2005/0064155 A1 Mar. 24, 2005

(30) Foreign Application Priority Data

Sep. 18, 2003 (JP) ........................................ 2003-325926

(51) Int. Cl.[7] ............................................... B41M 5/40
(52) U.S. Cl. ................... 428/32.79; 428/32.81; 428/195.1
(58) Field of Search ........................... 428/32.77, 32.78, 428/32.79, 32.81, 32.82, 195.1

(56) References Cited

U.S. PATENT DOCUMENTS 6,139,947 A * 10/2000 Miyakusa et al. ....... 428/32.69
6,869,650 B2 * 3/2005 Burch et al. ............. 428/32.52

FOREIGN PATENT DOCUMENTS

JP  2003-080844 A  3/2003

* cited by examiner

*Primary Examiner*—Rena Dye
*Assistant Examiner*—Timothy M. Speer
(74) *Attorney, Agent, or Firm*—Birch, Stewart, Kolasch & Birch, LLP

(57) ABSTRACT

The present invention provides a protective layer thermal transfer sheet in which: a protective layer having a thermal transferring property is placed on at least one portion of one of the faces of a substrate sheet and the protective layer is formed by successively laminating at least a peeling layer, a plasticizer resistant layer and a heat adhesive resin layer on the substrate sheet, and in this structure, the heat adhesive resin layer is made from a polyester-urethane resin; and a printed article with the protective layer transferred thereto.

9 Claims, 1 Drawing Sheet

PROTECTIVE LAYER THERMAL TRANSFER SHEET AND PRINTED ARTICLE WITH PROTECTIVE LAYER

This Non-provisional application claims priority under 35 U.S.C. § 119(a) on Patent Application No(s). 2003-325926 filed in Japan on Sep. 18, 2003, the entire contents of which are hereby incorporated by reference.

BACKGROUND OF THE INVENTION

1. Field of the Invention

This invention relates to a protective layer thermal transfer sheet and a printed article having an image on which the protective layer of the sheet is transferred.

2. Description of the Related Art

Conventionally, images such as tone images and mono-tone images including characters and symbols have been formed on a base material through a thermal transfer system. With respect to the thermal transfer system, a heat-sensitive sublimation transfer system and a heat-sensitive melt transfer system have been widely used.

Of these system, in the heat-sensitive sublimation transfer system, a thermal transfer sheet, formed by placing a dye layer made by melting or dispersing a sublimable dye serving as a colorant in a binder resin on a base material, is used, and with this thermal transfer sheet being superposed on an image receiving sheet, energy in accordance with image information is applied to a heating device such as a thermal head so that the sublimable dye contained in the dye layer on the thermal transfer sheet is transferred to the image-receiving sheet; thus, an image is formed thereon.

This heat-sensitive sublimation transfer system makes it possible to control the amount of dye transfer on a dot basis in response to the quantity of energy to be applied to the thermal transfer sheet. Therefore, this system has the advantages of forming a superior tone image and of easily forming characters, symbols and the like.

By the way, various cards, such as social position certificates, driver's licenses, member evidences and ID cards, have been widely used. Various pieces of information, which clarify social positions, etc. of the owner, are recorded in these cards. In particular, with respect to ID cards and the like, the photographic image of face is important in addition to character information such as an address and a name, and the image needs to have a property (durability) of being less susceptible to change or degradation for a long time.

At present, with respect to information recording in these cards, the heat-sensitive sublimation transfer system has been adopted. In the tone image and mono-tone image formed by the heat-sensitive sublimation transfer system, however, since transferred dye is present on the surface of the transfer-receiving medium, the images are poor in resistance, such as solvent resistance and plasticizer resistance. For this reason, attempts have been made to improve the durability of images in cards that require durability, such as ID cards and the like on which face photographic images are recorded.

Japanese Patent Application Laid-Open No. 2003-080844 (patent document 1) has disclosed a protective layer thermal transfer sheet, in which a protective layer having a thermal transferring property is placed on at least one portion of one of the faces of a substrate sheet and the protective layer, which forms the outermost surface after a thermal transferring process, on the substrate sheet side contains a copolymer made from at least two or more components selected from methyl methacrylate, methacrylic amide and methacrylic acid.

The transfer sheet, disclosed in patent document 1, is used for transferring the protective layer onto a transfer-receiving medium (image-receiving sheet) with an image formed thereon so as to improve the durability of the image.

By using the transfer sheet described in patent document 1, the durability of the image is improved to a practically usable level; however, there have been demands for imparting further superior durability to an image (protected image) on which the protective layer is formed. For example, in the case when the protected image is made in contact with a soft vinyl chloride film containing a plasticizer for a long period, it is desired that the image should not be transferred on the film so as to prevent the image from degradation.

When a printed article (for example, driver's license) is carried in a pocket, the article is susceptible to forces such as a twisting force and a bending force, and even in such a case, it is desirable to maintain the protective layer less susceptible to cracks and chips. When cracks, chips or the like occur in the protective layer, these cause degradation in the image quality. When printed articles are kept in a bag such as a vinyl chloride sheet bag, a plasticizer contained in the vinyl chloride sheet tends to reach an image through the cracks and chips to cause degradation in the image. Moisture, lipids, such as sweat, and the like, which enter through cracks and the like, also cause degradation in the image quality.

Some printed articles (for example, ID cards) are susceptible to physical friction on the protective layer when they are passed through detection machines and the like, and it is desirable to improve the adhesion of the protective layer to the transfer-receiving medium so that the protective layer is not separated easily even in such cases.

SUMMARY OF THE INVENTION

The present invention has been made to solve the above-mentioned problems, and is to provide a protective layer thermal transfer sheet which provides superior durability, in particular, superior plasticizer resistance and bending resistance, to an image formed on a transfer-receiving medium.

The present invention provide a protective layer thermal transfer sheet comprising:

a protective layer having a thermal transferring property that is placed on at least one portion of one of faces of a substrate sheet, the protective layer being formed by successively laminating at least a peeling layer, a plasticizer resistant layer and a heat adhesive resin layer on the substrate sheet, wherein the heat adhesive resin layer comprises a polyester-urethane resin; and a printed article with the protective layer transferred thereto.

DETAILED DESCRIPTION OF THE INVENTION

The present invention relates to a protective layer thermal transfer sheet in which: a protective layer having a thermal transferring property is placed on at least one portion of one of the faces of a substrate sheet and the protective layer is formed by successively laminating at least a peeling layer, a plasticizer resistant layer and a heat adhesive resin layer on the substrate sheet, and in this structure, the heat adhesive resin layer comprises a polyester-urethane resin.

Figure 1:
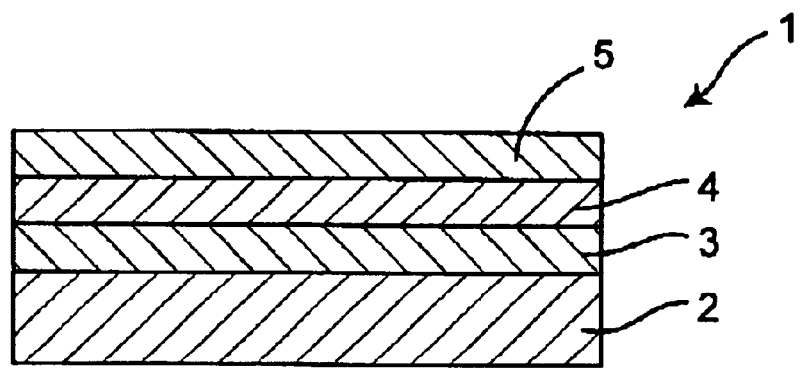
FIG. 1 is a schematic cross-sectional view that shows one embodiment of a protective layer thermal transfer sheet of the present invention.

FIG. 1 is a schematic cross-sectional view that shows one example of a protective layer thermal transfer sheet of the present invention. In this Figure, the protective layer thermal transfer sheet 1 is constituted by a peeling layer 3, a plasticizer resistant layer 4 and a heat adhesive resin layer that are successively formed on one of the faces of a substrate sheet 2.

With respect to the substrate sheet 1, not particularly limited, the same substrate sheet as those widely used in this field may be used. Examples of the substrate sheet include: polyesters having high heat resistance, such as polyethylene terephthalate, polyethylene naphthalate, polybutylene terephthalate, polyphenylene sulfide, polyether ketone and polyether sulfone; and plastic films, such as polypropylene, polycarbonate, cellulose acetate, derivatives of polyethylene, polyvinyl chloride, polyvinylidene chloride, polystyrene, polyamide, polyimide, polymethyl pentene and ionomer, and a laminated member thereof. The above-mentioned plastic film may be used as a stretched film, or may be used as an unstretched film. The thickness of the substrate sheet, which is properly selected by taking the strength, heat resistance and the like into consideration, is normally set in the range approximately from 1 to 100 $\mu$m.

The peeling layer 3 is constituted by a binder resin. With respect to the binder resin, those known thermoplastic resins and thermosetting resins that have been used in the present field may be widely used.

With respect to the thermoplastic resin, examples thereof include acryl-based resins such as polymethacrylic acid, polymethacrylamide, methyl polymethacrylate, ethyl polymethacrylate and butyl polyacrylate; vinyl-based resins such as polyvinyl acetate, vinyl chloride-vinyl acetate copolymer, polyvinyl alcohol and polyvinyl butyral; and cellulose derivatives such as ethyl cellulose, nitrocellulose and cellulose acetate.

With respect to the thermosetting resin, examples thereof include unsaturated polyester resins, polyester resins, polyurethane-based resins and amino alkyd resins.

Among these binder resins, acryl-based resins are preferably used.

Among these binder resins, one kind may be used alone, or two or more kinds thereof may be used in combination.

The peeling layer may contain wax in addition to a binder resin. The addition of the wax makes it possible to improve abrasion resistance and foil-separating property of the peeling layer.

With respect to the wax, examples thereof include: polyethylene wax, polyester wax, polystyrene-based powder, olefin-based powder, microcrystalline wax, carnauba wax, paraffin wax, Fischer-Tropsch wax, various kinds of low-molecular-weight polyethylene, haze wax, beeswax, spermaceti, wool grease, shellac wax, candelilla wax, petrolactam, partially-modified wax, fatty acid esters, and fatty acid amides.

The content of the wax is normally set in a range approximately from 0.1 to 30% by weight, preferably, approximately from 0.1 to 10% by weight, in the peeling layer.

In the present invention, the peeling layer may contain an ultraviolet ray absorbing agent. The addition of the ultraviolet ray absorbing agent makes it possible to improve light resistance and weather resistance of images, etc. on the transfer-receiving medium coated with the protective layer after the transferring process.

With respect to the ultraviolet ray absorbing agent, those conventionally known organic ultraviolet ray absorbing agents, such as salicylate-based agents, benzophenone-based agents, benzotriazole-based agents, substituted acrylonitrile-based agents, nickel chelate-based agents, and hindered amine-based agents, may be widely used. With respect to each of these ultraviolet ray absorbing agents, an ultraviolet ray absorbing resin in which an addition polymerizable double bond, such as a vinyl group, an acryloyl group and a methacryloyl group, or a functional group, such as an alcoholic hydroxide group, an amino group, a carboxylic group, an epoxy group and an isocyanate group, is introduced may be contained in the peeling layer.

Various additives, such as an antioxidant and a fluorescent whitener, may be added to the peeling layer. The peeling layer is formed through processes in which: ink, prepared by adding necessary additives such as wax to the binder resin and dissolving or dispersing the resulting mixture in a solvent such as water and an organic solvent, is applied to the substrate sheet by using a normal coating method such as a gravure printing method, a screen printing method and a reverse roll coating method using a gravure plate, and the coated substrate sheet is dried.

The thickness of the peeling layer is normally set in a range approximately from 0.1 to 10 $\mu$m, preferably approximately from 0.5 to 5 $\mu$m.

In the present invention, a release layer may be further formed between the peeling layer 3 and the substrate sheet 2, if necessary.

When the peeling property between the substrate sheet and the protective layer is not appropriate, the release layer is formed so as to adjust the adhesive property between the substrate sheet and the protective layer and carry out a peeling process of the protective layer smoothly.

The release layer is constituted by, for example, materials such various waxes such as silicone wax and various resins such as silicone resin, fluorine resin, acrylic resin, water soluble resin, cellulose derivative resin, urethane-based resin, acetic acid-based vinyl resin, acrylic vinyl ether-based resin and maleic anhydride resin, and mixtures of these.

The release layer is formed through processes in which: a coating solution containing at least one material selected from the group consisting of the above-mentioned waxes and resins is applied to the substrate sheet by using a conventionally known coating method and the resulting substrate sheet is dried. The thickness of the release layer is normally set in a range approximately from 0.5 to 5.0 $\mu$m.

When the release layer is formed, the formation is preferably made so that the thermal transferring resin layer is separated from the peeling layer upon transferring, while the release layer is allowed to remain on the substrate sheet side.

The plasticizer resistant layer 4 is constituted by an acrylic-based copolymer resin containing at least two or more components selected from methyl methacrylate, methacrylamide or methacrylic acid, and the solubility parameter (SP) of the copolymer is not less than 11, and the glass transition temperature (Tg) thereof is set to not more than 70° C. (preferably, from 50 to 70° C.).

The plasticizer resistant layer is formed through processes in which: ink, prepared by dissolving or dispersing the acrylic-based copolymer resin and the other additives in a solvent such as water and an organic solvent, is applied to a substrate sheet or a peeling layer formed on the substrate sheet, by using a normal coating method such as a gravure printing method, a screen printing method and a reverse roll coating method using a gravure plate, and the resultant layer is dried.

The thickness of the plasticizer resistant layer is normally set in a range approximately from 0.1 to 10 µm, preferably, approximately from 0.5 to 5 µm.

The heat adhesive resin layer 5 improves the transferring property and adhesive property to a printed article that is a transfer-receiving medium.

With respect to the resin forming the heat adhesive resin layer, any of conventionally known resins to be blended in adhesives, heat sensitive adhesives and the like may be used; and thermoplastic resins having a glass transition temperature (Tg) in a range from 50 to 80° C. are preferably used. Examples of such thermoplastic resins include: polyester resin, vinyl chloride-vinyl acetate copolymer resin, acrylic resin, butyral resin, epoxy resin, polyamide resin and vinyl chloride resin.

Preferable resins are polyester-urethane resins, which has a skeleton formed of a polyol component and a diisocyanate component, and these resins have an urethane group concentration of 800 to 1,700 (eq/ton), preferably 800 to 1,600 (eq/ton), a glass transition temperature in a range from 60 to 80° C., preferably from 60 to 75° C., and a molecular weight in a range from 8,000 to 17,000, preferably from 10,000 to 17,000. When such polyester-urethane resin as above is used for forming the heat adhesive resin layer, it is possible to provide a protective layer having superior bending resistance.

In the present invention, the urethane group concentration means a concentration of urethane groups per unit weight. The glass transition temperature means the one measured by means of differential scanning calorimeter. The molecular weight means weight average molecular weight (Mw) measured by means of gel permeation chromatography (GPC). The solubility parameter (SP) means the one obtained by calculation on the basis of chemical structure.

By allowing the heat adhesive resin layer 5 to contain the ultraviolet ray absorbing agent, it becomes possible to improve the light resistance and weather resistance of an image coated with the protective layer that has been transferred. With respect to the ultraviolet ray absorbing agent to be contained, the aforementioned ultraviolet ray absorbing agents may be used. Additives such as an antioxidant and a fluorescent whitener may be added thereto.

The heat adhesive resin layer is formed through processes in which: ink, prepared by dissolving or dispersing the resin and the other additives in a solvent such as water and an organic solvent, is applied to the plasticizer resistant layer by using a normal coating method such as a gravure printing method, a screen printing method and a reverse roll coating method using a gravure plate, and the resulting layer is dried.

The thickness of the thermal adhesive layer is normally set in a range approximately from 0.1 to 10 µm, preferably, approximately from 0.5 to 5 µm.

In the present invention, a back layer may be formed on the other face of the substrate sheet. The back layer is formed so as to prevent heat seal between a heating device such as a thermal head and the substrate sheet 2 and provide a smooth running of the sheet. With respect to the resin to be used for this back layer, examples thereof include: cellulose-based resins, such as ethyl cellulose, hydroxy cellulose, hydroxypropyl cellulose, methyl cellulose, cellulose acetate, cellulose butyrate, nitrocellulose; vinyl-based resins, such as polyvinyl alcohol, polyvinyl acetate, polyvinyl butyral, polyvinyl acetal and polyvinyl pyrrolidone; acrylic-based resins, such as methyl polymethacrylate, ethyl polyacrylate, polyacrylamide and acrylonitrile-styrene copolymer; polyamide resin; polyvinyl toluene resin; coumarone indene resin; polyester-based resin; polyurethane resin; and a single substance or a mixture of natural or synthetic resins, such as silicone modified or fluorine-modified urethane. In order to further improve the heat resistance of the back layer, among the above-mentioned resins, a resin having a hydroxide-group-based reactive group (for example, butyral resin, acetal resin and the like) is used while polyisocyanate or the like is used in combination as a crosslinking agent; thus, a crosslinked resin layer is preferably used as the back layer.

In order to impart a sliding property with the thermal head, a solid-state or liquid-state release agent or lubricant may be added to the back layer so as to provide a heat-resistant lubricating property. With respect to the release agent or lubricant, examples thereof include: various waxes such as polyethylene wax and paraffin wax; various surfactants, such as higher fatty alcohol, organopolysiloxane, anionic surfactants, cationic surfactants, amphoteric surfactants, nonionic surfactants and fluorine-based surfactants; fine particles of inorganic compounds, such as organic carboxylic acid and derivatives thereof, fluorine-based resins, silicone-based resins, talc and silica. The amount of lubricant to be contained in the back layer is set in a range from 5 to 50% by weight, preferably, approximately from 10 to 30% by weight, in the back surface.

The back layer is formed through processes in which: ink, prepared by dissolving or dispersing the resin and the other additives in a solvent such as water and an organic solvent, is applied to the substrate sheet by using a normal coating method such as a gravure printing method, a screen printing method and a reverse roll coating method using a gravure plate, and the resulting layer is dried. The thickness of the back layer is normally set in a range approximately from 0.1 to 10 µm, preferably, approximately from 0.5 to 5 µm.

The protective layer thermal transfer sheet of the present invention is not intended to be limited by the above-mentioned mode, and is desirably formed in accordance with the intended purpose as a sheet such as a composite protective layer thermal transfer sheet between a thermally transferring protective layer and a heat sublimable color material layer, and a composite protective layer thermal transfer sheet between a thermally transferring protective layer and a heat meltable color material layer. In the case of the former composite protective layer thermal transfer sheet, as long as the transfer-receiving medium has a receiving layer for dyes, an image-forming process through a thermal transfer system and a transferring process of the protective layer to the transfer-receiving medium are simultaneously carried out.

With respect to the protective-layer transferring sheet, for example, a protective layer thermal transfer sheet in which a thermal transferring protective layer and at least one color material layer selected from the group consisting of a heat sublimable color material layer and a heat meltable color material layer are formed on one of the faces of a substrate sheet in a face-sequential manner may be used.

Figure 2:
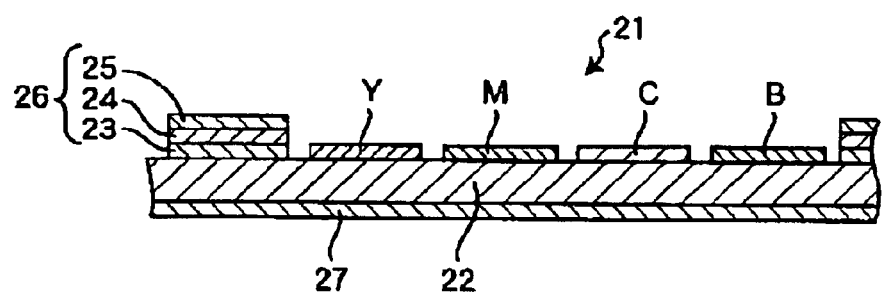
FIG. 2 is a schematic cross-sectional view that shows another embodiment of a protective layer thermal transfer sheet of the present invention.

FIG. 2 is a schematic cross-sectional view that shows another example of the protective layer thermal transfer sheet of the present invention. In FIG. 2, the protective layer thermal transfer sheet 21 of the present invention is constituted by a heat sublimable color material layer Y, a heat sublimable color material layer M, a heat sublimable color material layer C, a heat sublimable color material layer B and a thermal transferring protective layer 26 that are formed on one of the faces of a substrate sheet 22 in a face-sequential manner, with a back layer 27 being formed on the other face of the substrate sheet 22. The thermal transferring protective layer 26 is constituted by, for example, a peeling layer 23, a plasticizer resistant layer 24 and a heat adhesive resin layer 25.

The heat sublimable color material layers Y, M, C and B, shown in FIG. 2, may be replaced by heat meltable color material layers Y, M, C and B, or a mixed structure of these layers may be used.

With respect to the transfer-receiving medium on which the protective layer is transferred by using the protective layer thermal transfer sheet of the present invention, not particularly limited, any material may be used.

Examples of the transfer-receiving medium include sheet substrates, such as plain paper, high-quality paper, tracing paper and a plastic film. The transfer-receiving medium may have any one of shapes including a card, a post card, a passport, letter paper, report paper, a notebook and a catalogue.

Specific examples of the transfer-receiving medium of the present invention include: premium tickets, such as share certificates, bonds, certificates, passbooks, train tickets, bicycle or horse race tickets, stamps, postal stamps, theater tickets, entrance tickets and other tickets; various cards, such as cash cards, credit cards, prepaid cards, members cards, greeting cards, post cards, name cards, driver's licenses, IC cards and optical cards; cases such as cartons and containers; bags; forms, envelopes, tags, OHP sheets, slide films, bookmarks, calendars, posters, pamphlets, menus, passports, POP articles, coasters, displays, name plates, keyboards, cosmetics, ornaments, such as wristwatches and lighters; stationary such as writing materials and report paper; building materials, panels, emblems, keys, cloths, clothing, footwear, apparatuses such as radios, televisions, electronic calculators and OA devices, various sample catalogues, albums, outputs from computer graphics, medical image outputs, and the like.

The image on the transfer-receiving medium may be formed through any one of the systems, such as an electrophotographic system, an ink-jet recording system and a thermal transfer recording system.

The heat sublimable color material layer is, for example, a layer formed by allowing a binder resin to support a dye that is thermally transferred mainly through sublimation.

With respect to the dye, not particularly limited, any conventionally known dyes to be used for a thermal transferring sheet may be used effectively. Preferable examples of dyes include: magenta dyes such as MS Red G, Macrolex Red Violet R, Ceres Red 7B, Samaron Red HBSL and Resolin Red F3BS. With respect to yellow dyes, preferable examples include: Phorone Brilliant Yellow 6GL, PTY-52 and Macrolex Yellow 6G. With respect to cyan dyes, examples thereof include: Kayaset Blue 714, Waxsolin blue AP-FW, Phorone Brilliant Blue S-R and MS Blue 100.

With respect to the binder resin used for supporting the above-mentioned dye, any one of those conventionally known resins may be used. Preferable examples of the binder resin include: cellulose-based resins, such as ethyl cellulose, hydroxy ethyl cellulose, ethyl hydroxyl cellulose, hydroxypropyl cellulose, methyl cellulose, cellulose acetate and cellulose butyrate; vinyl-based resins, such as polyvinyl alcohol, polyvinyl acetate, polyvinyl butyral, polyvinyl acetal, polyvinyl pyrrolidone and polyacrylamide; and polyester-based resins. Among these, cellulose-based resins, vinyl-based resins such as polyvinyl butyral and polyvinyl acetal, and polyester-based resins are preferably used from the viewpoints of heat resistance and dye transferring property.

Various conventionally known additives may be further added to the heat sublimable color material layer, if necessary.

The content of the above-mentioned dye is normally set in a range approximately from 5 to 90% by weight, preferably, approximately from 10 to 70% by weight, with respect to the total amount of the heat sublimable color material layer.

The heat sublimable color material layer is formed through processes in which: a heat sublimable color material layer-forming paint or ink, prepared by dissolving or dispersing the heat sublimable dye, the binder resin and the other optional components in an appropriate solvent, is applied to the substrate sheet in a face-sequential manner, and the resulting layer is dried.

The thickness of the heat sublimable color layer is normally set in a range approximately from 0.2 to 5 $\mu$m, preferably, approximately from 0.4 to 2 $\mu$m.

The heat meltable color material layer is formed by allowing a binder to support a colorant.

With respect to the colorant, among organic or inorganic pigments and dyes, those having preferable characteristics as a recording material, for example, those which have a sufficient coloring density and are not susceptible to a color change to brown due to light, heat, temperatures and the like, are preferably used. With respect to the colorant of this type, for examples, those having colors, such as black, cyan, magenta and yellow, are used.

With respect to the binder, for example, a mixture, mainly composed of wax to which materials, such as drying oil, resin, mineral oil, cellulose derivatives and rubber derivatives, are blended, is used.

With respect to the wax, various waxes, such as microcrystalline wax, carnauba wax, paraffin wax, Fischer-Tropsch wax, various kinds of low-molecular-weight polyethylene, haze wax, beeswax, spermaceti, ibotallow, wool grease, shellac wax, candelilla wax, petrolactam, polyester wax, partially-modified wax, fatty acid ester, and fatty acid amide, may be used.

With respect to the binder, materials such as vinyl chloride-vinyl acetate copolymer resin, acrylic resin, rubber chloride, vinyl chloride, vinyl chloride-vinyl acetate copolymer resin and cellulose-based resin, may also be used.

The heat meltable color material layer is formed through processes in which: a heat meltable color material layer-forming composition, prepared by mixing the colorant, the binder resin and the other additives, if necessary, is applied to the substrate sheet by using a coating method such as a hot-melt coating method, a hot lacquer coating method, a gravure coating method, a gravure reverse-coating method, a knife coating method, an air coating method and a roll coating method, and the resulting layer is dried.

The thickness of the heat meltable color material layer is normally set in a range approximately from 0.1 to 8 $\mu$m, preferably, approximately from 0.4 to 2 $\mu$m.

The heat meltable color material layer to be formed on the substrate sheet may be prepared as one layer, or may be prepared as two or more layers.

In the present invention, a primer layer may be formed between the substrate sheet and the heat sublimable color material layer. In the present invention, a peeling layer may be formed between the substrate sheet and the heat meltable color material layer. This peeling layer may be the same as the aforementioned peeling layer.

Upon using the protective layer thermal transfer sheet of the present invention, any one of conventionally known application methods of the protective-layer thermal sheet, as it is, may be used. For example, the heat adhesive resin layer face of the protective layer thermal transfer sheet of the present invention is superposed on the transfer-receiving medium so that the thermal transferring resin layer is thermally transferred onto the transfer-receiving medium.

Effects of the Invention

The application of the protective layer thermal transfer sheet of the present invention makes it possible to further improve the durability of an image formed on a transfer-receiving medium. Therefore, even when the transfer-receiving medium having the image has been made in contact with a film such as a soft vinyl chloride film containing a plasticizer for a long time, it is possible to prevent one portion of the image from being transferred onto the film, and since the transfer-receiving medium on which the protective layer is formed has sufficient bending resistance, the sheet is less susceptible to cracks for a long time, thereby making it possible to maintain the same quality of the image for a long time.

The following description will discuss the present invention by means of examples. In the following description, "parts" refer to "mass parts" and "%" refers to "mass %", unless otherwise indicated.

EXAMPLE 1
Formation of Protective Layer Thermal Transfer Sheet

Formation of Back Layer

Ink for a back-layer, which had the following composition, was applied to one of the faces of a polyethylene terephthalate film (made by Toray Co., Ltd., processed to be easily bonded) having a thickness of 6 $\mu$m by using a gravure coating method (amount of coat: 1.0 g/m$^2$ (dried state)), and the coated layer was dried. This was then subjected to a curing process to form a back layer.

| | |
|---|---|
| Polyvinyl butyral (made by Sekisui Chemical Co. Ltd., S-LEC BX-1) | 15 parts by weight |
| Polyisocyanate (made by Dainippon and Chemicals Incorporated, Burnock D450) | 35 parts by weight |
| Phosphate ester surfactant (made by Daiichi Kogyo Seiyaku Co., Ltd., Plysurf A208S) | 10 parts by weight |
| Talc (made by Nippon Talc Co., Ltd., Microace P-3) | 3 parts by weight |

Formation of Release Layer

Ink for release-layer, which had the following composition, was applied to the face opposite to the back layer by using a gravure coating method (amount of coat: 0.7 g/m$^2$ (dried state)), and the coated layer was dried to form a release layer.

| | |
|---|---|
| Silicone-modified acrylic resin (made by Daicel Chemical Industries Ltd., Celltop 226 solid component: 50%) | 16 parts by weight |
| Aluminum catalyst (made by Daicel Chemical Industries Ltd., Celltop CAT-A solid component: 10%) | 3 parts by weight |
| Methylethyl ketone | 8 parts by weight |
| Toluene | 8 parts by weight |

Formation of Peeling Layer

Ink for peeling-layer-having the following composition was applied onto a release layer so as to have a layer thickness of 1.0 $\mu$m after having been dried, by using a gravure coating method, and the coated layer was dried to form a peeling layer.

| | |
|---|---|
| Acrylic resin (made by Mitsubishi Rayon Co., Ltd., BR-85) | 40 parts by weight |
| Polyester resin (made by Toyobo Co., Ltd., Vylon 200) | 2 parts by weight |
| Methylethyl ketone | 50 parts by weight |
| Toluene | 50 parts by weight |

Formation of Plasticizer Resistant Layer

A methyl methacrylate-methacylic acid copolymer (Tg: 70° C., SP value: 11.6) was synthesized. By using this copolymer, a ink for plasticizer-resistant-layer, which had the following composition, was applied to the peeling layer so as to have a layer thickness of 1.5 $\mu$m after having been dried, by using a gravure coating method, and the coated layer was dried to form a plasticizer resistant layer.

| | |
|---|---|
| Methyl methacrylate-methacrylic acid copolymer | 100 parts by weight |
| Methylethyl ketone | 50 parts by weight |
| Isopropyl alcohol | 50 parts by weight |

Formation of Heat Adhesive Resin Layer

Polyester-urethane resins of ten kinds as shown in Table 1 were synthesized.

TABLE 1

| Sample | Urethane-group concentration [eq/ton] | Molecular weight | Glass transition temperature Tg (° C.) |
|---|---|---|---|
| Sample 1 | 850 | about 10000 | 65 |
| Sample 2 | 1600 | about 17000 | 70 |
| Sample 3 | 1550 | about 10000 | 70 |
| Sample 4 | 1600 | about 13000 | 70 |
| Sample 5 | 1200 | about 15000 | 70 |
| Comparative Sample 1 | 0 | about 8000 | 85 |
| Comparative Sample 2 | 700 | about 12000 | 75 |
| Comparative Sample 3 | 1400 | about 14000 | 90 |
| Comparative Sample 4 | 1600 | about 7000 | 70 |
| Comparative Sample 5 | 1600 | about 16000 | 85 |

By using each of the polyester-urethane resins shown in Table 1, ink for heat adhesive resin-layer, which had the following composition, was applied to the plasticizer resistant layer so as to have a layer thickness of 1.5 μm after having been dried through a gravure coating method, and the coated layer was dried to form a heat adhesive resin layer.

| Polyester-urethane resin | 100 parts by weight |
|---|---|
| Methylethyl ketone | 50 parts by weight |
| Toluene | 50 parts by weight |

Formation of Heat Sublimable Color Material Layer

The same polyethylene terephthalate film as used for forming the protective layer thermal transfer sheet was used, and a back layer was formed on one of the faces in the same manner. On the face opposite to the back layer, each of the following dye-layer inks was applied by using a gravure coating method so that each of dye layers of yellow, magenta and cyan was formed thereon in a manner so as to have 1 g/m² after having been dried.

Yellow Dye Layer Ink Composition

| Quinophthalone-based dye represented by the following formula (a) | 6.7 parts by weight |
|---|---|
| Styryl-based dye represented by the following formula (b) | 0.3 parts by weight |
| Acetoacetal resin (made by Sekisui Chemical Co. Ltd., KS-5) | 3.5 parts by weight |
| Phosphate-based surfactant (made by Daiichi Kogyo Seiyaku Co., Ltd., Plysurf A208S) | 0.1 part by weight |
| Polyethylene powder (made by ASTOR WAX Co., MF8F) | 0.1 part by weight |
| Toluene | 45 parts by weight |
| Methylethyl ketone | 45 parts by weight |

Magenta Dye Layer Ink Composition

| Methine-based dye represented by the following formula (c) | 2.1 parts by weight |
|---|---|
| Anthraquinone-based dye represented by the following formula (d) | 2.7 parts by weight |
| Anthraquinone-based dye represented by the following formula (e) | 1.8 parts by weight |
| Acetoacetal resin (made by Sekisui Chemical Co. Ltd., KS-5) | 3.5 parts by weight |
| Phosphate-based surfactant (made by Daiichi Kogyo Seiyaku Co., Ltd., Plysurf A208S) | 0.1 part by weight |
| Polyethylene powder (made by ASTOR WAX Co., MF8F) | 0.3 parts by weight |
| Toluene | 45 parts by weight |
| Methylethyl ketone | 45 parts by weight |

Cyan Dye Layer Ink Composition

| Indoaniline-based dye represented by the following formula (f) | 2.5 parts by weight |
|---|---|
| Anthraquinone-based dye represented by the following formula (g) | 2.5 parts by weight |
| Methine-based dye represented by the following formula (h) | 1.3 parts by weight |
| Acetoacetal resin (made by Sekisui Chemical Co. Ltd., KS-5) | 4.0 parts by weight |

-continued

| Phosphate-based surfactant (made by Daiichi Kogyo Seiyaku Co., Ltd., Plysurf A208S) | 0.07 parts by weight |
|---|---|
| Phosphate-based surfactant (made by Daiichi Kogyo Seiyaku Co., Ltd., Plysurf M208BM) | 0.05 parts by weight |
| Polyethylene powder (made by ASTOR WAX Co., MF8F) | 0.3 parts by weight |
| Toluene | 45 parts by weight |
| Methylethyl ketone | 45 parts by weight |

Formula (a)

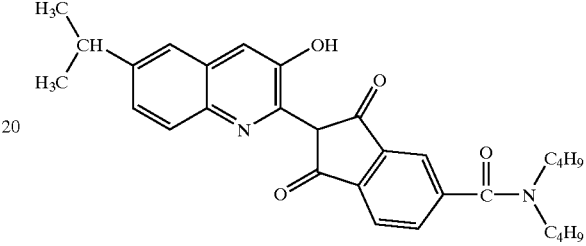

Formula (b)

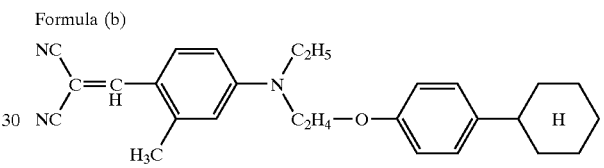

Formula (c)

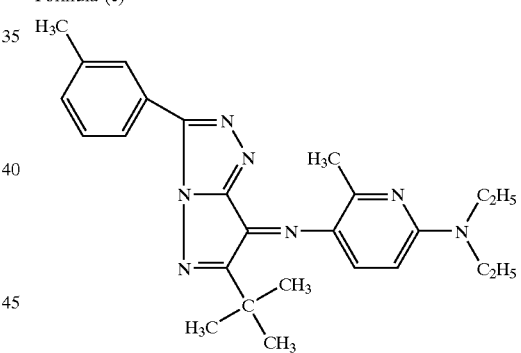

Formula (d)

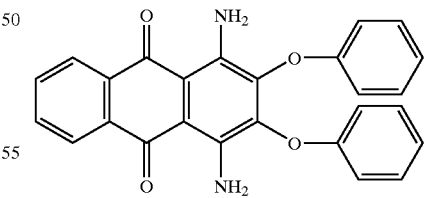

Formula (e)

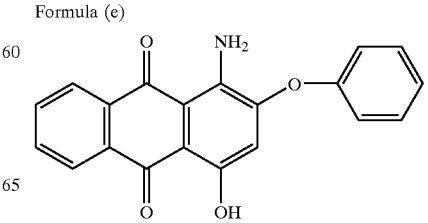

-continued

Formula (f)
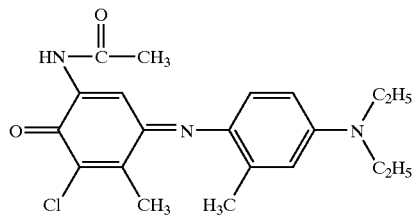

Formula (g)
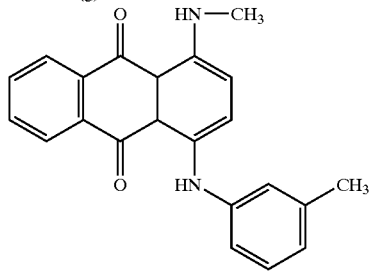

Formula (h)
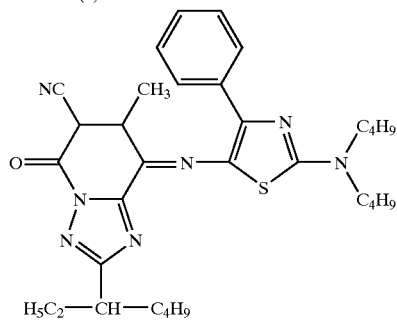

EXAMPLE 2

Production of Printed Article

By using a thermal transferring sheet on which the respective yellow, magenta and cyan color material layers and the protective layer had been formed, an image was formed on a card made from vinyl chloride (vinyl chloride card)(Length 85.5 mm×Width 54.0 mm×Thickness 0.8 mm) using a printer (Card Printer P310, made by ELTRON).

Each of the protective layer thermal transfer sheets, formed in the above-mentioned example 1, was superposed on an image-formed portion of the vinyl chloride card so that the protective layer was transferred from the protective layer thermal transfer sheet by using a printer (Card Printer P310, made by ELTRON) in a manner so as to cover the image-formed portion; thus, a printed article coated with the protective layer was formed.

Evaluation

Evaluation of Plasticizer Resistance

The protective-layer side of the printed article prepared through the above-mentioned processes was superposed on a soft vinyl chloride sheet containing a plasticizer (Altron #480, made by Mitsubishi Chemical Corp., 400 μm in thickness), and this was kept at 82° C. for 32 hours under a load of 70.2 $g/m^2$; thus, the image was observed for any degradation due to the plasticizer, and it was ranked as described below. The results are collectively shown in Table 2.

○: No image transfer to the vinyl chloride sheet was observed;

Δ: Image transfer to the vinyl chloride sheet was partially observed;

x: Image transfer to the vinyl chloride sheet was observed over the entire image.

Bending Resistance

The polyvinyl chloride card which was protected by the protective layer (printed article) was subjected to bending operations of 300 times in each of surface-rear/longitudinal-lateral directions (1200 times in total) in a range from 73 mm to 61 mm in the longitudinal direction as well as in a range from 54 to 50 mm in the lateral direction, and DOP was then applied to the surface of the protective layer by using #10 wire bar. After the application, this was then covered with a polyethylene sheet and kept at 40° C. for 8 hours; thus, the image was observed for any degradation due to the plasticizer. The observation results were ranked in the same manner as the evaluation of the plasticizer resistance. The results are collectively shown in Table 2.

TABLE 2

| | Heat adhesive resin layer | Plasticizer resistance | Bending resistance |
|---|---|---|---|
| Example 1 | Sample 1 | ○ | ○ |
| Example 2 | Sample 2 | ○ | ○ |
| Example 3 | Sample 3 | ○ | ○ |
| Example 4 | Sample 4 | ○ | ○ |
| Example 5 | Sample 5 | ○ | ○ |
| Comparative Example 1 | Comparative Sample 1 | Δ | Δ |
| Comparative Example 2 | Comparative Sample 2 | ○ | Δ |
| Comparative Example 3 | Comparative Sample 3 | X | X |
| Comparative Example 4 | Comparative Sample 4 | Δ | ○ |
| Comparative Example 5 | Comparative Sample 5 | Δ | Δ |

What is claimed is:

1. A protective layer thermal transfer sheet comprising:
a protective layer having a thermal transferring property that is placed on at least one portion of one of faces of a substrate sheet, the protective layer being formed by successively laminating at least a peeling layer, a plasticizer resistant layer and a heat adhesive resin layer on the substrate sheet,
wherein the heat adhesive resin layer comprises a polyester-urethane resin.

2. The protective layer thermal transfer sheet according to claim 1, wherein a release layer is formed between the substrate and the peeling layer.

3. The protective layer thermal transfer sheet according to claim 1, wherein the polyester-urethane resin has a urethane-group concentration of 800 to 1,700 (eq/ton), a glass transition temperature in a range from 60 to 80° C. and a molecular weight in a range from 8,000 to 17,000.

4. The protective layer thermal transfer sheet according to claim 3, wherein the polyester-urethane resin has a urethane-group concentration of 800 to 1,600 (eq/ton).

5. The protective layer thermal transfer sheet according to claim 3, wherein the polyester-urethane resin has a glass transition temperature in a range from 60 to 75° C.

6. The protective layer thermal transfer sheet according to claim 3, wherein the polyester-urethane resin has a molecular weight in a range from 10,000 to 17,000.

7. The protective layer thermal transfer sheet according to any one of claims 1 to 3, wherein a heat sublimable color material layer and/or a heat meltable color material layer are formed on one face of the substrate sheet together with the thermal transferring protective layer.

8. A printed article which is obtained by thermally transferring the protective layer of the protective layer thermal transfer sheet according to any one of claims 1 to 3 on an image on the printed article.

9. The printed article according to claim 8, wherein the image of the printed article is formed by using an electrophotographic system, an ink-jet recording system or a thermal transfer recording system.

* * * * *